April 28, 1970  F. R. NEBIKER  3,508,725
PILOT AIRBORNE RECOVERY DEVICE
Filed May 14, 1968  3 Sheets-Sheet 1

INVENTOR
FRED R. NEBIKER
BY:
Oldham & Oldham
ATTORNEYS

April 28, 1970      F. R. NEBIKER      3,508,725
PILOT AIRBORNE RECOVERY DEVICE
Filed May 14, 1968      3 Sheets-Sheet 2
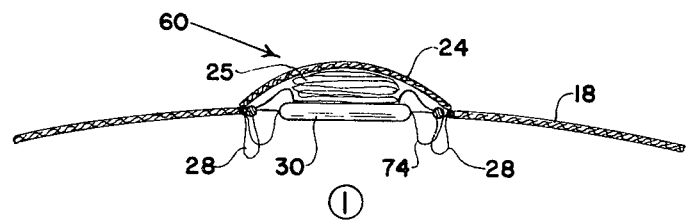
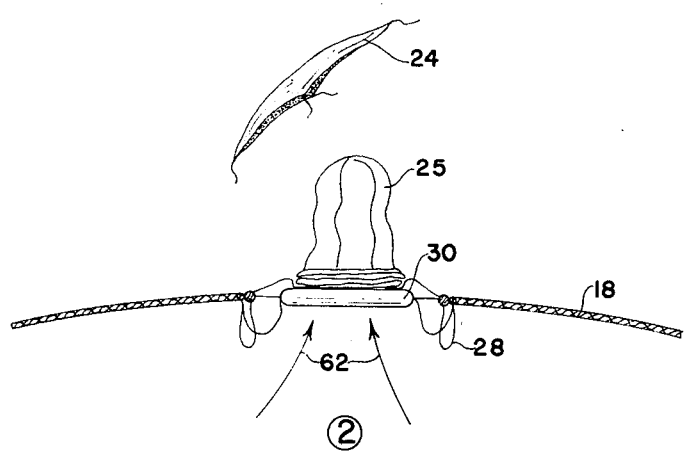
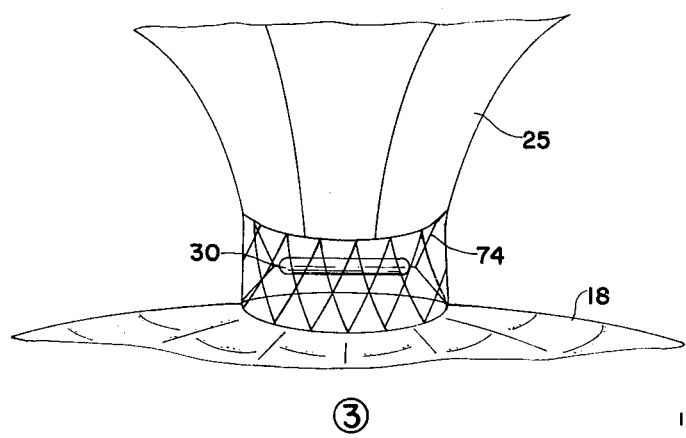
FIG-2
INVENTOR
FRED R. NEBIKER
BY:
Oldham & Oldham
ATTORNEYS April 28, 1970  F. R. NEBIKER  3,508,725
PILOT AIRBORNE RECOVERY DEVICE
Filed May 14, 1968  3 Sheets-Sheet 3

INVENTOR
FRED R. NEBIKER
BY:
Oldham & Oldham
ATTORNEYS

United States Patent Office 3,508,725
Patented Apr. 28, 1970

3,508,725
PILOT AIRBORNE RECOVERY DEVICE
Fred R. Nebiker, Akron, Ohio, assignor to Goodyear Aerospace Corporation, Akron, Ohio, a corporation of Delaware
Filed May 14, 1968, Ser. No. 728,968
Int. Cl. B64b 1/48; B64d 1/02
U.S. Cl. 244—32    9 Claims

ABSTRACT OF THE DISCLOSURE

A personnel escape system characterized by personnel-seat ejection, personnel-seat separation, and parachute deployment. A hot air balloon packaged on top of the parachute canopy is released and ram-air inflated until completely unfolded and deployed. The balloon is attached to the parachute by a chord suspension system and has its base opening aligned with an opening in the apex of the parachute. A gas burner is located within and between the openings of the balloon and parachute and provides a means to supply hot air to the balloon and achieve a controlled buoyancy equilibrium. The personnel or load held aloft by the balloon can then be retrieved by a pick-up aircraft.

---

A system that will keep flight personnel at any altitude between 3,000 and 6,000 feet for at least 30 minutes to enable recovery aircraft to retrieve the individual while he is in midair is needed by the art. The general object of the invention is to provide a device to meet these needs.

A further object of the invention is to provide a lightweight, inexpensive, and highly reliable suspension device consisting of a parachute, a balloon, and means to heat the gas within the balloon whereby suspension is selectively controlled and easily maintained, and in case of balloon failure, the parachute will still properly function to allow the safe descent of the individual.

The aforesaid objects of the invention and other objects which will become apparent as the description proceeds are achieved by providing a mechanism for supporting an airborne load which comprises a teardrop-shaped envelope having a large circular aperture at the pointed end to be carried aloft in collapsed condition with the load, a parachute attached to tthe pointed end of the envelope in collapsed condition having an aperture through the top thereof aligned with the aperture in the envelope, a harness connected to the parachute and carrying the load, means to retain the envelope in collapsed condition in attached relation to the parachute while the parachute is in flight condition, means to release and deploy the envelope, and means to create a controlled atmospheric density within the envelope to control the lift capability of the envelope.

For a better understanding of the invention, reference should be had to the accompanying drawings wherein:

FIG. 2 is a schematic sequential illustration showing the deployment of the balloon envelope.

Figure 1:
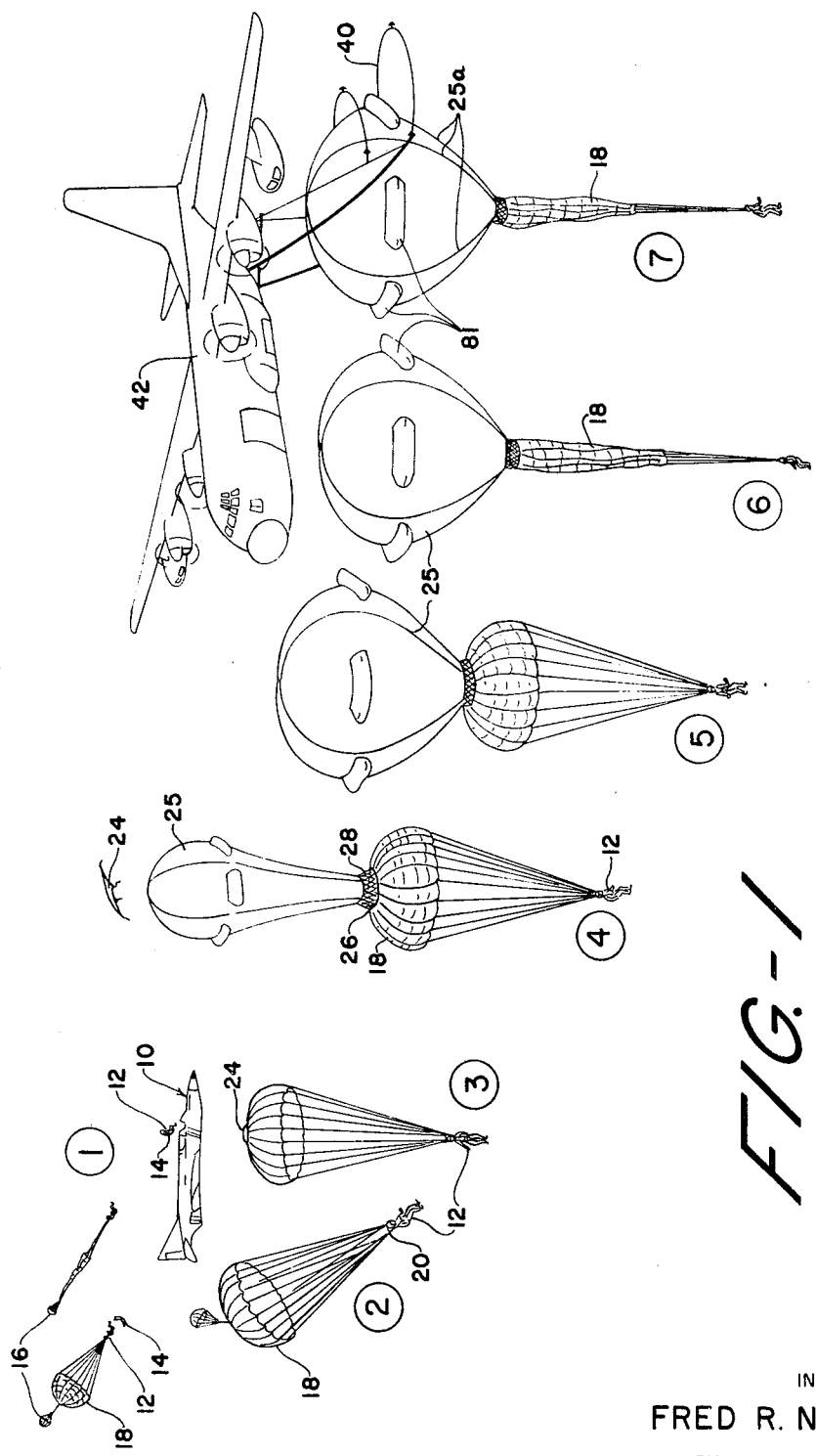
FIG. 1 is a schematic illustration of the invention showing its use in conjunction with personnel recovery upon ejection from an aircraft.

With reference to the form of the invention illustrated in FIG. 1 in the drawings, the numeral 10 indicates an aircraft from which an individual 12 and his seat 14 have been ejected. Sequentially, this is followed by deployment of a drogue chute 16 pulling out a main chute 18, followed by release of the chair 14, all of this shown in phase 1 of the drawing. In phase 2, the main parachute 18 illustrates the individual 12 suspended therefrom by a harness 20, all in the usual manner. Phase 3 illustrates parachute equilibrium.

Phase 4 illustrates balloon deployment caused by releasing of a cover mechanism 24 which held a balloon 25 in folded condition at the central top portion of the canopy of parachute 18. The balloon 25 is of a teardrop shape and aerodynamically stable with the apex or point of the tear having an opening or aperture which is mounted in aligned relationship with an aperture 26 in the top of the canopy of the parachute 18 by means of a geodetic, crisscross suspension system 28. The proposed physical dimension of the apertures 26 in the parachute and in the bottom end of the ballon for the configuration illustrated in FIG. 1 of the drawings, would be between about 3 feet to about 10 feet in diameter, but preferably about 6 feet in diameter with about a 3 foot separation between apertures achieved by the geodetic suspension system 28.

Inflation of the balloon 25 is accomplished by ram-air inflation during the descent of the parachute but not until the parachute is in equilibrium so loads on the balloon will be low. The ram-air inflation occurs rapidly by the funneling action of the parachute canopy. When the balloon 25 is approximately 40% to 70% inflated, a burner, indicated generally by numeral 30 in FIG. 3 of the drawings, is ignited by a control from the individual 12, or by some automatic system if this is desirable. The heating of the burner in combination with the ram-air inflation of the balloon 25 raises the mean gas temperature in the balloon so as to obtain equilibrium buoyancy. To change the float control altitude, the individual 12 operates a fuel flow-rate control valve 71. When the desired float altitude is achieved, a much lower fuel consumption is required to maintain that altitude. Schematic sequence 5 illustrates heating initiation showing the increased inflation within the balloon. Sequence 6 indicates the balloon in equilibrium causing the parachute 18 to hang limply. Sequence 7 illustrates the retrieval phase wherein the balloon 25 is snagged by a cable 40 extending down from a rescue plane 42. The recovery aircraft's retrieval hooks engage the balloon so as to cause a burst-type rupture and continue through the balloon to engage a nylon harness webbing 25a which forms a part of the structure thereof. Depending on the aircraft used, the individual can be hauled aboard or carried to a friendly territory and released for a normal parachute descent.

The balloon is stored in a packaged configuration on the parachute canopy, which is best illustrated in sequence 1 of FIG. 2. This package is illustrated by numeral 60, and is covered by a releasable restraining cord or cover 24. The package 60 is connected to the remainder of the canopy 18 by the geodetic suspension system 28. Release of the cover 24 may be accomplished in any of several ways, but preferably at some predetermined time interval after the canopy has been fully deployed, or by the actuation of the individual 12. In any event, the cover 24 is released and the balloon deployed, as clearly shown in FIG. 2, sequences 1, 2, and 3. As clearly illustrated in FIG. 2, the base opening of the balloon is attached to the parachute opening around its periphery by any releaseable mechanism such as a rip cord actuated by the personnel 12. Releasing the cover 24 exposes the folded balloon which is initially and partially deployed by the releasing action of the cover and further by the ram-air captured by the parachute and flowing up into the base opening of the balloon as indicated by arrows 62. Once the balloon is fully deployed by the ram-air, the attachment at the base of the balloon holding it to the opening in the parachute is released and the balloon separates from the parachute and is held in axial alignment with it by the suspension system 28 as clearly illustrated in sequence 3 of FIG. 2. At full deployment, of course, the geodetic suspension system 28 is stretched tight, and the burner assembly 30 is in position.

In determining an appropriate lighter-than-air system, candidate gases and their adaptability were reviewed. Primary candidates were helium, hydrogen, and hot air. Excessive tank weights and volumes, as well as cryogenic storage problems, eliminated helium and hydrogen. In establishing a feasible hot-air system, the items considered were as follows:

1—Optimum hot-air temperature
2—Balloon size and material
3—Thermal energy source and rate
4—Deployment environment An operating temperature of 250° F. was chosen as being optimum, although this range could vary between 175° to 325° F. A nominal balloon diameter of 35' is believed optimum, although this diameter might vary between 25' and 45' depending upon the weight requirements. A laminate material balloon consisting of ½ inch Mylar, as made by E. I. du Pont de Nemours & Co., and 1-inch square Dacron scrim proved most beneficial. The Mylar film provides the basic envelope for retaining the hot air, while the woven scrim functions as the primary load carrying member and provides a rip-stop characteristic. High stress areas are further reinforced, but the composite laminate weight has been determined as an average of 1 ounce per square yard.

The hot-air balloon must be deployed aft of the inflated parachute so that performance of the parachute is not impaired if the individual must revert to a standard parachute descent. The hot-air balloon should be at least partially inflated with ram-air to insure a positive balloon geometry prior to initiation of the heating cycle. As a result of the requirements, the balloon must be packaged and located on top of the inflated parachute canopy, and the initial ram-air flow must be through the parachute canopy, as is present in the embodiment described above. However, it is possible for a man to land with only the chute, not using the balloon, and then later rig and inflate the balloon for pickup at day or night.

Figure 3:
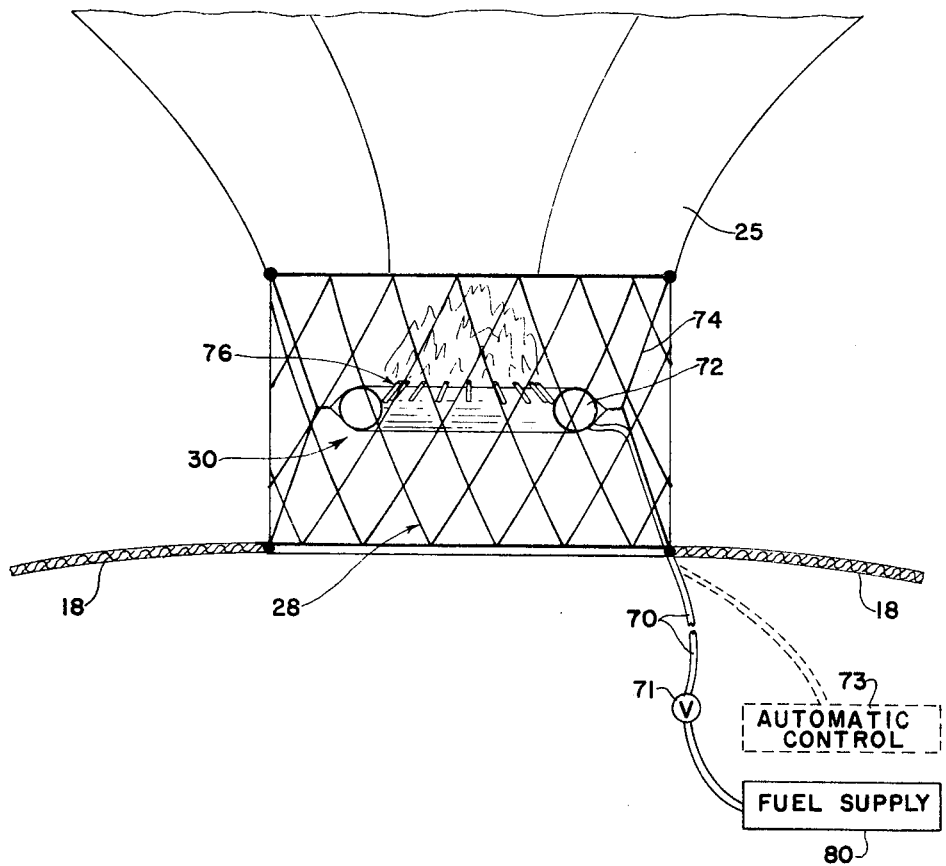
FIG. 3 is a greatly enlarged, broken-away illustration of the burner centrally positioned in the geodetic suspension system between the balloon and the parachute.

The best method for providing B.t.u. requirements for initial heating is to use butane gas with a burner that can operate at both high and low fuel consumption rates. Liquid butane is the best fuel, having better performance characteristics than propane or types of gasoline. Initial fuel consumption rates are much greater than the requirements to sustain temperature once the desired operating temperature is reached, but it is the design requirement that a sustained time of at least 30 minutes be built into the system. The choice of butane is also based to a great extent on its comparatively low vapor pressures, which greatly reduce the weight of the storage tanks. The fuel tank 80, as seen in FIG. 3, can be positioned either at the balloon inlet with the burner, or on the individual 12. The liquid butane is forced through a relatively small hose 70, as best seen in FIG. 3, to inflate a gas plenum 72 by means of its vapor pressure.

The basic approach will be to force the liquid butane by means of its vapor pressure into the plenum chamber 72, where the fuel becomes a gas. The volume and pressure of the gas in the plenum chamber must be compatible with both the high initial and the low sustaining combustion rates. The plenum 72 is mounted between the parachute 18 and the balloon 25 on tension line 74, again as best seen in FIG. 3. A plurality of injector tubes 76 mounted to the plenum 72 direct towards a central combustion point to give a burner design to provide the required air-fuel mixing with the least complicated hardware. A plenum pressure from 5 to 25 p.s.i. should accomodate both high and low B.t.u./hr. requirements in a single system controlled in the fluid state.

Control requirements for the pressure of the butane supply through hose 70 may be by a valve 71 operable by the individual 12, or by some automatic control means, indicated by dotted block 73.

Optimum sequencing is accomplished by programming specific events initiated by one of the following: time-delay from a previous event, barometric sensing and actuation, and discretionary individual manual override.

The basic parachute canopy can vary but must be structurally independent of the balloon subsystem. This object must be achieved so that the individual 12 can be recovered by parachute during a mechanical or structural failure of the balloon or during an air-to-air retrieval. The individual still will be able to execute normal parachute descent and landing operations after a balloon failure or after an unsuccessful retrieval.

In order to overcome aerodynamic instability, the balloon must be aerodynamically stable in the parachute wake throughout the inflation cycle. A balloon having a burble fence or flow separation appendages 81, as best seen in FIG. 1, demonstrates aerodynamic stability in the tandem system. The addition of the segments 81 places the balloon in the category of a ram-inflated aerodynamic stabilization and deceleration device, such as those currently designed and utilized in space capsule retrieval and the like.

The system utilizes a standard 4-line pickup harness encircling the balloon and terminating at the parachute. The pickup lines incorporate hooks to burst the balloon allowing the hooks then to grab onto the nylon reinforcing ribs 25a extending substantially vertically on the balloon 25.

Thus, it is seen that the objects of the invention have been achieved by incorporating a balloon with a parachute using a ram-air forced inflation of the balloon and a burner in combination to provide hot-air suspension of the balloon for retrieval purposes.

While in accordance with the patent statutes, only one best known embodiment of the invention has been illustrated and described in detail, it is to be particularly understood that the invention is not limited thereto or thereby, that various modifications may be made and still meet the objects of the invention.

What is claimed is:
1. A mechanism for supporting an airborne load which comprises:
an envelope having a large aperture at one end to be carried aloft in collapsed condition with the load, a parachute attached to said one end of the envelope in collapsed condition having an aperture through the top thereof aligned with the aperture in the envelope, a harness connected to the parachute and carrying the load, cover means to retain the envelope in collapsed condition in attached relation to the parachute while the parachute is in flight condition, means to release the cover means to release and deploy the envelope, and means to create a controlled atmospheric density within the envelope to control the lift capability of the envelope.

2. A mechanism according to claim 1 where the envelope is inflated by ram-air flow through the aperture in the top of the parachute and the aperture in the envelope, and includes flow separation appendages formed in the surface of the envelope to stabilize the envelope and parachute in flight.

3. A mechanism according to claim 2 where the appendages are raised ribs spaced uniformly around the circumference of the upper surface of the envelope substantially concentrically aligned to the vertical axis of the envelope.

4. A mechanism according to claim 1 where the envelope is positioned in spaced relation from the top of the parachute in deployed condition by a geodetic suspension system.

5. A mechanism according to claim 4 which includes a burner substantially centrally positioned in the geodetic suspension system means to feed fuel to the burner for combustion, whereby the heat of combustion heats the gas within the envelope.

6. A mechanism according to claim 5 where the burner is an inflatable plenum, and a tank containing butane is connected to the plenum whereby the vapor pressure of the butane inflates the plenum and directs the butane in gaseous form into a suitable mixture with the atmosphere for combustion.

7. A mechanism according to claim 5 where the burner is an inflatable plenum, and a tank containing liquid butane is connected to the plenum, means to vaporize the butane right out of the tank whereby the vapor pressure of the butane inflates the plenum and directs the butane in gaseous form into a suitable mixture with the atmosphere for combustion.

8. An airborne recovery device comprising:
   a parachute having an opening at its apex,
   a lighter-than-air balloon having an opening in its base and located outside and on top of the parachute and having its opening axially aligned with the opening in the parachute apex,
   a suspension means attached to the parachute and the balloon adjacent the openings holding them in spaced and axial alignment,
   means to controllably provide for ram air inflation of the balloon through the aligned openings, and
   means to create a controlled atmospheric density within the balloon to control the lift capability of the balloon.

9. A recovery device according to claim 8 where the means to control the atmospheric density is a burner located within the suspension means and below the balloon base opening to increase the temperature of the gas within the balloon to control the lift capability thereof.

References Cited

UNITED STATES PATENTS

| | | | |
|---|---|---|---|
| 2,941,750 | 6/1960 | Smith et al. | 244—32 |
| 3,096,048 | 7/1963 | Yost | 244—31 |
| 3,161,896 | 12/1964 | Holt et al. | 244—142 |

MILTON BUCHLER, Primary Examiner

J. E. PITTENGER, Assistant Examiner

U.S. Cl. X.R.

244—138, 148